US010223483B1

(12) United States Patent
Tan et al.

(10) Patent No.: US 10,223,483 B1
(45) Date of Patent: Mar. 5, 2019

(54) METHODS FOR DETERMINING RESISTIVE-CAPACITIVE COMPONENT DESIGN TARGETS FOR RADIO-FREQUENCY CIRCUITRY

(71) Applicant: Intel Corporation, Santa Clara, CA (US)

(72) Inventors: Tat Hin Tan, Bayan Lepas (MY); William Walter Fergusson, Sunnyvale, CA (US); Chieu Fung Tan, Bukit Mertajam (MY)

(73) Assignee: Intel Corporation, Santa Clara, CA (US)

( * ) Notice: Subject to any disclaimer, the term of this patent is extended or adjusted under 35 U.S.C. 154(b) by 60 days.

(21) Appl. No.: 15/390,322

(22) Filed: Dec. 23, 2016

(51) Int. Cl.
 *G06F 17/50* (2006.01)
 *G06F 11/34* (2006.01)

(52) U.S. Cl.
 CPC ...... *G06F 17/5009* (2013.01); *G06F 11/3457* (2013.01); *G06F 17/5022* (2013.01); *G06F 17/5036* (2013.01); *G06F 2217/84* (2013.01)

(58) Field of Classification Search
 CPC ............ G06F 17/5009; G06F 17/5036; G06F 2217/84; G06F 11/3457; G06F 17/5022
 See application file for complete search history.

(56) References Cited

U.S. PATENT DOCUMENTS

| | | | |
|---|---|---|---|
| 5,703,588 A * | 12/1997 | Rivoir | H03M 1/0604 341/118 |
| 6,041,169 A * | 3/2000 | Brennan | G06F 17/5022 703/13 |
| 6,212,490 B1 | 4/2001 | Li et al. | |
| 6,295,630 B1 * | 9/2001 | Tamegaya | G06F 17/5036 257/E21.53 |
| 6,349,272 B1 * | 2/2002 | Phillips | G06F 17/5036 703/14 |
| 6,654,712 B1 * | 11/2003 | Blair | G06F 17/5022 703/13 |
| 6,701,495 B1 * | 3/2004 | Radke | G06F 17/5036 338/320 |

(Continued)

*Primary Examiner* — Helen Rossoshek
(74) *Attorney, Agent, or Firm* — Treyz Law Group, P.C.; Jason Tsai

(57) ABSTRACT

A methodology for defining resistance-capacitance (RC) design targets based on radio-frequency (RF) simulation is provided. In particular, the method may involve first determining capacitance targets and then determining resistance targets. To compute the capacitance targets, integrate circuit design and simulations tools may run transient analysis to identify critical nodes, perform small signal and sensitivity analysis for the capacitance on the critical nodes, revise original RF specifications by allocating additional margin, and perform interpolation among multiple capacitance values to obtain capacitive design targets that meet the revised specifications. To compute the resistance targets, the circuit design tools may identify critical transistors, run single-pass and DC operating point simulation to determine initial resistance values for the critical transistors, simplify parallel resistive networks, perform sensitivity analysis on the simplified networks, and perform interpolation among multiple resistive values to obtain resistive design targets meet the original RF performance specifications.

19 Claims, 14 Drawing Sheets

(56) References Cited

U.S. PATENT DOCUMENTS

| | | | |
|---|---|---|---|
| 6,826,517 B2* | 11/2004 | Okada | G06F 17/5018 703/2 |
| 7,024,645 B2* | 4/2006 | Sumikawa | G06F 17/5045 716/108 |
| 7,278,124 B2 | 10/2007 | Shimazaki et al. | |
| 7,552,406 B2* | 6/2009 | Johnson | G06F 17/5036 703/1 |
| 7,930,652 B2* | 4/2011 | Wood | G06F 17/5036 716/113 |
| 7,983,889 B2* | 7/2011 | Miura | G06F 17/5036 703/14 |
| 8,185,853 B2* | 5/2012 | Kim | G06F 17/5036 703/16 |
| 8,209,161 B2* | 6/2012 | Zhu | G03F 7/705 703/13 |
| 8,527,926 B2* | 9/2013 | Nitta | G06F 17/5009 716/101 |
| 8,670,969 B1* | 3/2014 | Kundert | G06F 17/5036 703/13 |
| 9,009,636 B2* | 4/2015 | Matsubara | G06F 17/5036 703/14 |
| 9,286,421 B1* | 3/2016 | Kukal | G06F 17/5022 |
| 9,484,973 B1* | 11/2016 | Carroll | H04B 1/28 |
| 9,916,415 B2* | 3/2018 | Anderson | G06F 17/5081 |
| 2002/0077798 A1* | 6/2002 | Inoue | G06F 17/5036 703/19 |
| 2007/0136045 A1* | 6/2007 | Rao | G06F 17/5036 703/14 |
| 2008/0072182 A1* | 3/2008 | He | G06F 17/504 716/113 |
| 2008/0134109 A1 | 6/2008 | Hammouda et al. | |
| 2010/0275170 A1 | 10/2010 | Subramanian et al. | |
| 2012/0072881 A1* | 3/2012 | Kobayashi | G06F 17/5031 716/130 |
| 2013/0047131 A1* | 2/2013 | Sugiyama | G06F 17/5036 716/113 |
| 2014/0165017 A1* | 6/2014 | Barnaby | G06F 17/5036 716/112 |
| 2014/0191181 A1* | 7/2014 | Moon | H01L 27/2409 257/4 |

* cited by examiner

| Regression Coeff | Cap Node 1 | Cap Node 2 | Cap Node 3 | Cap Node 4 | Cap Node 5 |
|---|---|---|---|---|---|
| Spec 1 | CRegrCoef11 | CRegrCoef12 | CRegrCoef13 | CRegrCoef14 | CRegrCoef15 |
| Spec 2 | CRegrCoef21 | CRegrCoef22 | CRegrCoef23 | CRegrCoef24 | CRegrCoef25 |
| Spec 3 | CRegrCoef31 | CRegrCoef32 | CRegrCoef33 | CRegrCoef34 | CRegrCoef35 |

FIG. 8A

| Correlation Coeff | Cap Node 1 | Cap Node 2 | Cap Node 3 | Cap Node 4 | Cap Node 5 |
|---|---|---|---|---|---|
| Spec 1 | CCorrCoef11 | CCorrCoef12 | CCorrCoef13 | CCorrCoef14 | CCorrCoef15 |
| Spec 2 | CCorrCoef21 | CCorrCoef22 | CCorrCoef23 | CCorrCoef24 | CCorrCoef25 |
| Spec 3 | CCorrCoef31 | CCorrCoef32 | CCorrCoef33 | CCorrCoef34 | CCorrCoef35 |

FIG. 8B

| Regression Coeff | RPU1 | RPU2 | RPU3 | RPU4 | RPU5 |
|---|---|---|---|---|---|
| Spec 1 | RPURegrCoef11 | RPURegrCoef12 | RPURegrCoef13 | RPURegrCoef14 | RPURegrCoef15 |
| Spec 2 | RPURegrCoef21 | RPURegrCoef22 | RPURegrCoef23 | RPURegrCoef24 | RPURegrCoef25 |
| Spec 3 | RPURegrCoef31 | RPURegrCoef32 | RPURegrCoef33 | RPURegrCoef34 | RPURegrCoef35 |

FIG. 13A — 1300

| Correlation Coeff | RPU1 | RPU2 | RPU3 | RPU4 | RPU5 |
|---|---|---|---|---|---|
| Spec 1 | RPUCorrCoef11 | RPUCorrCoef12 | RPUCorrCoef13 | RPURCorrCoef14 | RPUCorrCoef15 |
| Spec 2 | RPUCorrCoef21 | RPUCorrCoef22 | RPUCorrCoef23 | RPUCorrCoef24 | RPUCorrCoef25 |
| Spec 3 | RPUCorrCoef31 | RPUCorrCoef32 | RPUCorrCoef33 | RPURCorrCoef34 | RPUCorrCoef35 |

ASSUMING MEASUREMENT ALREADY PASSES
DESIRED SPEC, COMPUTE STEP FOR EACH SPEC:

$$\Delta Rpu_{jk} = \frac{|Meas_j - Spec_j|}{|Rpu\ RegrCoef_{jk}|}, \quad \begin{array}{l} j: \text{ALL SPECS} \\ k: \text{ALL TRANSISTORS} \end{array}$$

1402

SET $\Delta Rpu_k' = MIN_j\ (\Delta Rpu_{jk})$ $= MIN\ (\Delta Rpu_{1k}, \Delta Rpu_{2k}, ...)$

FIG. 14

METHODS FOR DETERMINING RESISTIVE-CAPACITIVE COMPONENT DESIGN TARGETS FOR RADIO-FREQUENCY CIRCUITRY

BACKGROUND

Integrated circuits often include analog circuits for supporting radio-frequency (RF) operation. Analog circuits operating at such high frequencies are typically sensitive to parasitic components such as parasitic resistive components and capacitive components (sometimes referred to collectively as "RC" components), whose values may vary depending on how the analog circuits are physically laid out on the integrated circuit die.

As an example, it is generally desirable to arrange the components in a symmetrical or systematic configuration to help minimize possible mismatches or mitigate other random processing effects. As another example, it is generally desirable to place two connected circuits close to each other to minimize the propagation delay between them. In general, it is important to avoid costly layout iterations for the RF/analog circuit design on more advanced process technology nodes since additional iterations slow down the design process and drive up cost.

One way to reduce the number of iterations is to provide resistive-capacitive (RC) design targets for the circuit layout designer to meet when drawing the layout so that the post layout design will still meet the overall RF design specifications. However, conventional methods for identifying accurate RC design targets is a rather manual as well as laborious task for the circuit designer. Quick prototyping tools have been developed that enable layout designers to quickly evaluate their layout design to see if it violates the circuit designer's RF design specifications. The layout designer, however, rarely has the experience of know-how to translate the RF design specifications such as gain-bandwidth (GBW), slew rate, or jitter into RC design targets.

It is within this context that the embodiments described herein arise.

SUMMARY

This relates generally to integrated circuits and ways for implementing integrated circuits using computer-aided design and simulations tools running on computing equipment. In particular, a methodology for defining resistive-capacitive (RC) design targets based on radio-frequency simulation is provided.

The methodology involves first determining target capacitance values and then determining target resistance values based on the target capacitance values. The target capacitance values may be derived by selectively performing sensitivity analysis on only a subset of capacitances on the integrated circuit, whereas the target resistance values may be derived by selectively performing sensitivity analysis on only a subset of resistances on the integrated circuit.

In obtaining the target capacitance values, transient simulation may be performed to identify non-stationary nodes that are especially sensitive to variations in capacitance. The sensitivity analysis may be performed with additional capacitance margin to produce regression and correlation coefficient values. The radio-frequency performance specifications may then be revised based on RF measurements to determine initial capacitance values. Interpolation can then be performed to compute the target capacitance values that satisfy the revised performance specifications.

To obtain the target resistance values, sensitivity analysis may be performed to identify critical transistors in the integrated circuit. Single-pass and DC operating point simulation may be performed to determine suitable initial resistance values at the drain/gate/source terminals of the critical transistors. The various resistances associated with the critical transistors may then be grouped and simplified into pull-up resistive networks, pull-down resistive networks, and push-pull resistive networks. Sensitivity analysis may then be performed on the simplified resistor networks to obtain regression/correlation coefficient values. Interpolation can then be performed to compute the target resistance values that satisfy the original RF performance specifications using the regression coefficients.

Further features of the invention, its nature and various advantages will be more apparent from the accompanying drawings and following detailed description.

BRIEF DESCRIPTION OF THE DRAWINGS

FIG. 8A is a table of regression coefficient values showing how much RF measurement parameters vary with respect to changes in the capacitance at each non-stationary node in accordance with an embodiment.

FIG. 8B is a table of correlation coefficient values indicating which node capacitances are influential for each RF measurement parameter in accordance with an embodiment.

FIG. 13A is a table of regression coefficient values for pull-up resistance in accordance with an embodiment.

FIG. 13B is a table of correlation coefficient values for pull-up resistance in accordance with an embodiment.

FIG. 14 is a flow chart of illustrative steps for deriving interpolation step sizes for the pull-up resistance in accordance with an embodiment.

DETAILED DESCRIPTION

Embodiments of the present invention relate to a methodology for defining resistive-capacitive (RC) design targets for an integrated circuit based on radio-frequency (RF) simulation.

Conventional ways for defining RC design targets only employ Spice-based transient simulations, which only draws upon signal slope, current source detection, bias signal detection, and fan-out considerations and are not capable of analyzing analog circuits.

In accordance with at least some embodiments, more accurate RC design targets can be obtained by extracting measurement data from RF simulation/analysis, which may include: multitone harmonic balance alternating current (AC) analysis, shooting Newton AC analysis, multitone harmonic balance noise analysis, shooting Newton Noise analysis, periodic time-dependent noise analysis, multitone harmonic balance transfer function analysis, shooting Newton transfer function analysis, envelope analysis, etc. The premise of this methodology is that the pre-layout design should have sufficient design margin (e.g., more than 30% design margin) to account for post-layout wiring parasitics. It will be recognized by one skilled in the art, that the present exemplary embodiments may be practiced without some or all of these specific details. In other instances, well-known operations have not been described in detail in order not to unnecessarily obscure the present embodiments.

Figure 1:
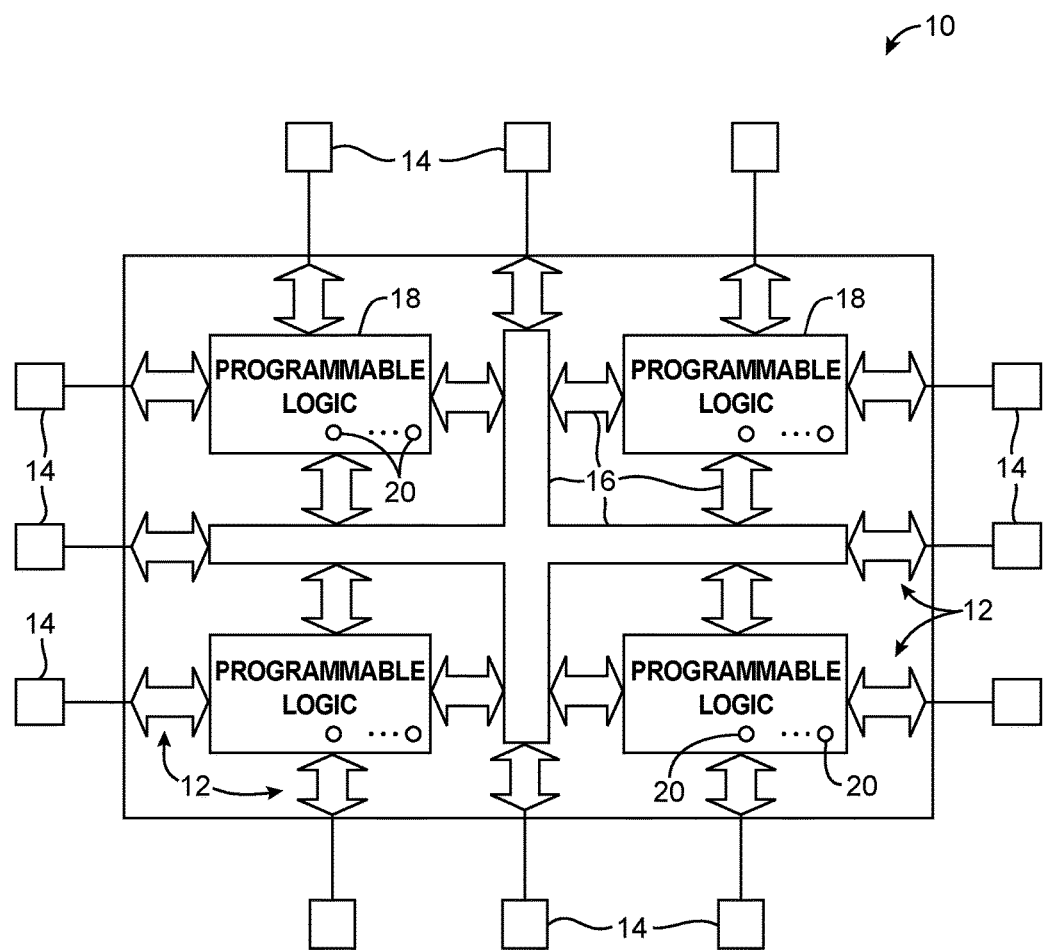
FIG. 1 is a diagram of a programmable integrated circuit in accordance with an embodiment.

An illustrative embodiment of an integrated circuit such as a programmable logic device (PLD) 10 that may be designed using computer-aided design tools is shown in FIG. 1. Programmable logic device 10 may have input-output (I/O) circuitry 13 for driving signals off of PLD 10 and for receiving signals from other devices. Input-output (I/O) circuitry 13 may include conventional input-output (I/O) circuitry, serial data transceiver circuitry, differential receiver and transmitter circuitry, or other circuitry used to connect one integrated circuit to another integrated circuit.

Programmable logic regions may include programmable components such as digital signal processing circuitry 12, storage circuitry 16, or other combinational and sequential logic circuitry organized in logic array blocks (LABs) 11. The programmable logic regions may be configured to perform a custom logic function. If desired, the programmable logic region may include digital signal processing circuitry 12 and storage circuitry 16, which both may be organized in specialized processing blocks that have limited configurability. The programmable logic region may include additional specialized processing blocks such as programmable phase-locked loop circuitry, programmable delay-locked loop circuitry, or other specialized processing blocks with limited configurability.

The circuitry of programmable logic device 10 may be organized using any suitable architecture. As an example, the logic of programmable logic device 10 may be organized in a series of rows and columns of larger programmable logic regions each of which contains multiple smaller logic regions. The smaller regions may be, for example, regions of logic that are sometimes referred to as logic elements (LEs) or basic logic elements (BLEs), each containing a look-up table, one or more registers, and programmable multiplexer circuitry. The smaller regions may also be, for example, regions of logic that are sometimes referred to as adaptive logic modules (ALMs), configurable logic blocks (CLBs), slice, half-slice, etc. Each adaptive logic module may include a pair of adders, a pair of associated registers and a look-up table or other block of shared combinational logic (i.e., resources from a pair of LEs—sometimes referred to as adaptive logic elements or ALEs in this context). The larger regions may be, for example, logic array blocks (LABs) or logic clusters of regions of logic containing multiple logic elements or multiple ALMs. The LABs 11 may also be referred to as "logic sectors," or "sectors of logic fabric." Generally, regions in PLD 10 that contain multiple LABs may be referred to as the "logic fabric" of the PLD 10.

Vertical interconnection resources 14 and horizontal interconnection resources 15 such as global and local vertical and horizontal conductive lines and buses may be used to route signals on PLD 10. Vertical and horizontal interconnection resources 14 and 15 include conductive lines and programmable connections between respective conductive lines and are therefore sometimes referred to as programmable interconnects.

Figure 3:
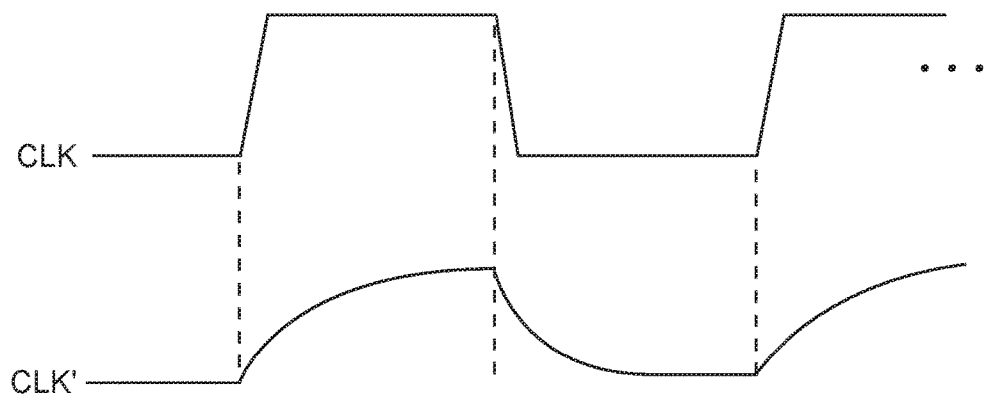
FIG. 3 is a diagram showing how parasitic components may degrade performance in the time domain in accordance with an embodiment.

Integrated circuit device 10 may include a first circuit such as circuit 200-1 that is connected to a second circuit such as circuit 200-2 via an interconnect path such as wire 202 (see FIG. 3). Circuits 200-1 and 200-2 may represent any two digital and/or analog circuit blocks within device 10 that communicate with each other. The quality of communication between circuits 200-1 and 200-2 may depend on the physical characteristics of wire 202. For example, if circuits 200-1 and 200-2 are placed far apart, then the parasitic resistance and series inductance associated with wire 202 may be pronounced. To help reduce the resistance, the width of wire 202 may be increased. As another example, if wire 202 is placed close to another parallel routing wire or if there are many large transistors connected at the input of circuit 200-2, then the parasitic capacitance at one terminal of wire 202 may be increased.

Figure 2A:
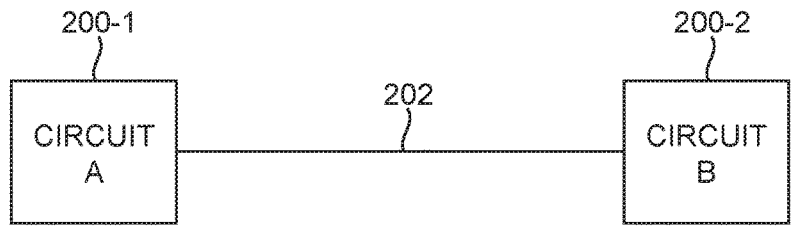
FIGS. 2A and 2B show how a path between two circuit blocks can be modeled using parasitic components in accordance with an embodiment.
Figure 2B:
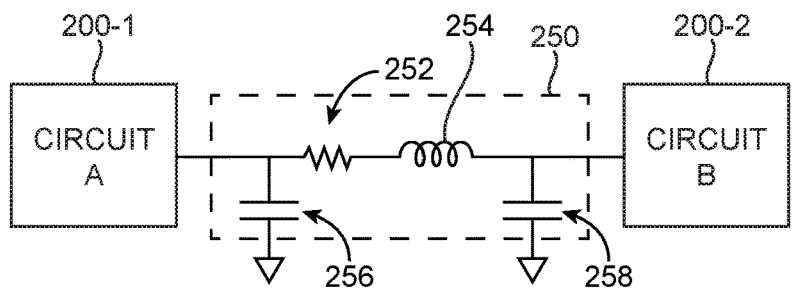

In other words, the actual physical layout of circuits 200-1 and 200-2 may directly affect how much parasitic loading is seen at wire 202. FIG. 2B shows one suitable way for modeling wire 202 as a transmission line. As shown in FIG. 2B, transmission line model 250 may include a series resistance 252, a series inductance 254, and shunt capacitances 256 and 258. The particular model 250 of FIG. 2B is merely illustrative and serves only to show how a generic communication path can include various parasitic components.

Figure 2C:
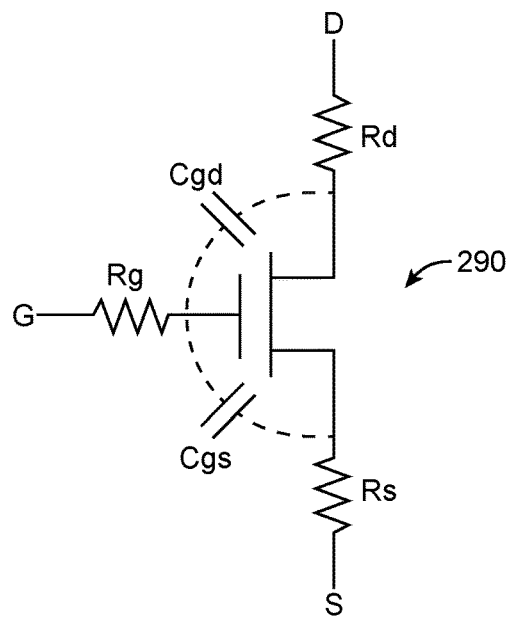
FIG. 2C is a diagram illustrating parasitic components associated with a transistor in accordance with an embodiment.

FIG. 2C shows how a transistor such as transistor 290 on device 10 can also exhibit various parasitic loading components. For example, transistor 290 may exhibit at its gate terminal some gate contact resistance Rg, at its drain terminal some drain contact resistance Rd, at its source terminal some source contact resistance Rs, a gate-to-drain capacitance Cgd between its gate and drain terminals, and a gate-to-source capacitance Cgs between its gate and source terminals (just to name a few). Larger transistors will typically exhibit great parasitic capacitances at its gate/drain/source terminals. The terminal resistances may be affected by the number of contact vias formed at each terminal or whether the terminals are silicided (as examples).

In general, it may be desirable to minimize the impact of parasitic components but it is not always possible to do so given area constraints (e.g., it is generally desirable to reduce parasitic resistance, inductance, and capacitance at all critical operating nodes in device 10). For radio-frequency applications, it may generally be desirable to properly quantify and accurately estimate the parasitic resistance and capacitance (RC) values since RF performance is most sensitive to these two parameters.

FIG. 3 shows how parasitic RC components may affect the transient performance of a post-layout circuit. The top portion of FIG. 3 shows the waveform of a clock signal CLK that a circuit designer might expect from a pre-layout design. Due to parasitic RC components in the post-layout circuit, the waveform of the clock signal might be degraded, as shown by waveform CLK' in the bottom portion of FIG. 3. In the example of FIG. 3, the rise times and fall times of the clock signal and the slew rate may all be reduced.

Figure 4:
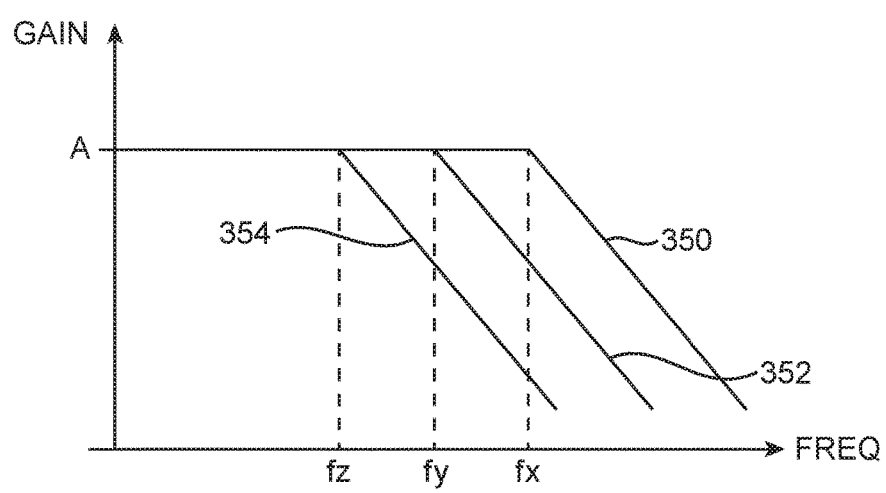
FIG. 4 is a diagram showing how parasitic components may degrade performance in the frequency domain in accordance with an embodiment.

FIG. 4 shows how parasitic RC components may also affect the frequency domain performance of a post-layout circuit. As shown in FIG. 4, curve 350 represents the frequency response with a gain-bandwidth product of A*fx that a circuit designer might expect from a pre-layout design. Frequency response 352 represents a post-layout design having a first amount of parasitic RC components, which causes the circuit to exhibit a degraded gain-bandwidth of A*fy (i.e., bandwidth fy is less than fx). Frequency response 354 represents a different post-layout design having a second amount of parasitic RC component that is more than the first amount associated with response 352, which would cause the circuit to exhibit an even less desirable gain-bandwidth (GBW) of A*fz (i.e., 3 dB roll-off frequency fz is even smaller than fy).

FIGS. 3 and 4 show the potential negative performance impact that unaccounted parasitic RC components may have on a circuit design. It is therefore imperative to preemptively account for these effects by accurately defining RC design targets based using radio-frequency (RF) simulation. In accordance with an embodiment, computer-aided design (CAD) tools in a circuit design system may be used by a circuit designer to design an integrated circuit with the help of RF simulation tools.

Figure 5:
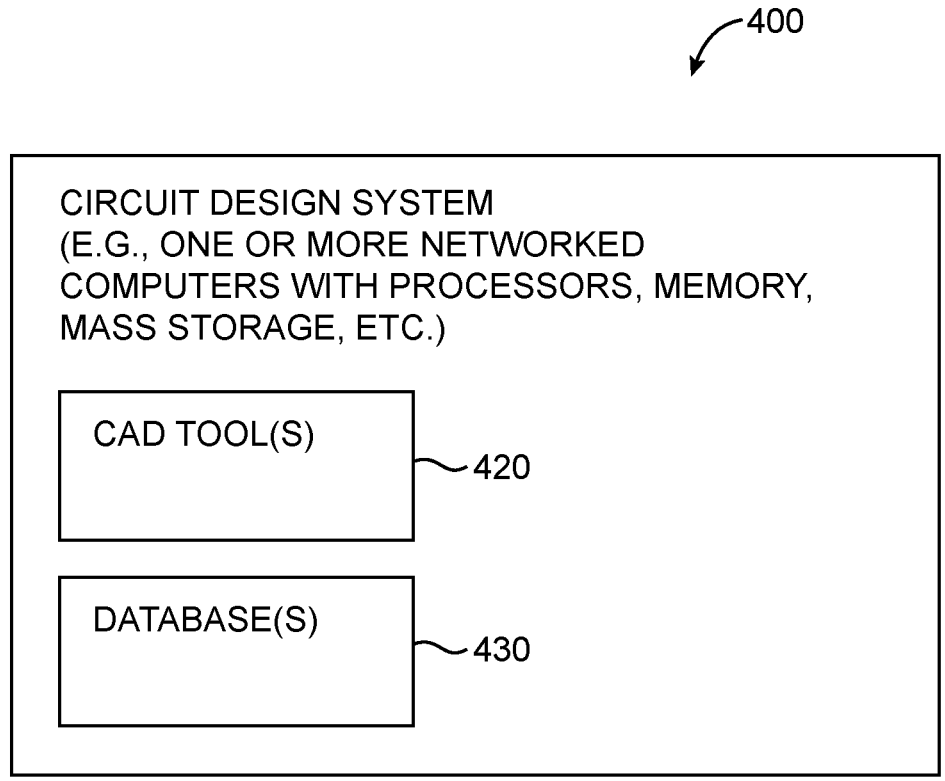
FIG. 5 is a diagram of a circuit design system that may be used to design integrated circuits in accordance with an embodiment.

An illustrative circuit design system 400 in accordance with an embodiment is shown in FIG. 5. Circuit design system 400 may be implemented and may run on integrated circuit design computing equipment. For example, system 400 may be based on one or more processors such as personal computers, workstations, etc. The processor(s) may be linked using a network (e.g., a local or wide area network). Memory in these computers or external memory and storage devices such as internal and/or external hard disks may be used to store instructions and data.

Software-based components such as computer-aided design tools 420 and databases 430 reside on system 400. During operation, executable software such as the software of computer aided design tools 420 runs on the processor(s) of system 400. Databases 430 are used to store data for the operation of system 400. In general, software and data may be stored on any computer-readable medium (storage) in system 400. Such storage may include computer memory chips, removable and fixed media such as hard disk drives, flash memory, compact discs (CDs), digital versatile discs (DVDs), Blu-ray discs (BDs), other optical media, and floppy diskettes, tapes, or any other suitable memory or storage device(s). When the software of system 400 is installed, the storage of system 400 has instructions and data that cause the computing equipment in system 400 to execute various processes. When performing these processes, the computing equipment is configured to implement the functions of the circuit design system.

The computer aided design (CAD) tools 420, some or all of which are sometimes referred to collectively as a CAD tool, a circuit design tool, or an electronic design automation (EDA) tool, may be provided by a single vendor or by multiple vendors. Tools 420 may be provided as one or more suites of tools (e.g., a compiler suite for performing tasks associated with implementing a circuit design in a programmable logic device) and/or as one or more separate software components (tools). Database(s) 430 may include one or more databases that are accessed only by a particular tool or tools and may include one or more shared databases. Shared databases may be accessed by multiple tools. For example, a first tool may store data for a second tool in a shared database. The second tool may access the shared database to retrieve the data stored by the first tool. This allows one tool to pass information to another tool. Tools may also pass information between each other without storing information in a shared database if desired.

Figure 6:
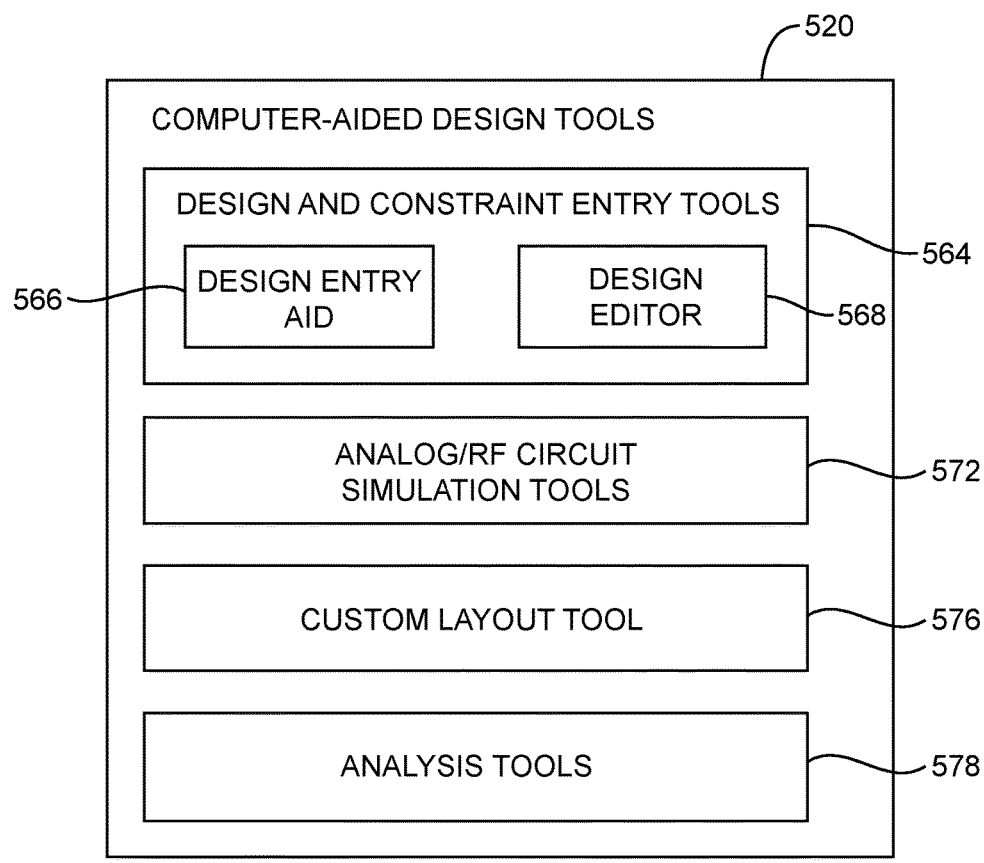
FIG. 6 is a diagram of illustrative computer-aided design (CAD) tools that may be used in a circuit design system in accordance with an embodiment.

Illustrative computer aided design tools 520 that may be used in a circuit design system such as circuit design system 400 of FIG. 5 are shown in FIG. 6. The design process may start with the formulation of functional specifications of the integrated circuit design (e.g., a functional or behavioral description of the integrated circuit design). A circuit designer may specify the functional operation of a desired circuit design using design and constraint entry tools 564. Design and constraint entry tools 564 may include tools such as design and constraint entry aid 566 and design editor 568. Design and constraint entry aids such as aid 566 may be used to help a circuit designer locate a desired design from a library of existing circuit designs and may provide computer-aided assistance to the circuit designer for entering (specifying) the desired circuit design.

As an example, design and constraint entry aid 566 may be used to present screens of options for a user. The user may click on on-screen options to select whether the circuit being designed should have certain features. Design editor 568 may be used to enter a design (e.g., by entering lines of hardware description language code), may be used to edit a design obtained from a library (e.g., using a design and constraint entry aid), or may assist a user in selecting and editing appropriate prepackaged code/designs.

Design and constraint entry tools 564 may be used to allow a circuit designer to provide a desired circuit design using any suitable format. For example, design and constraint entry tools 564 may include tools that allow the circuit designer to enter a circuit design.

As another example, design and constraint entry tools 564 may include a schematic capture tool. A schematic capture tool may allow the circuit designer to visually construct integrated circuit designs from constituent parts such as logic gates and groups of logic gates. Libraries of preexisting integrated circuit designs may be used to allow a desired portion of a design to be imported with the schematic capture tools.

After the design has been entered using design and constraint entry tools 564, analog/RF circuit simulation tools 572 may be used to simulate the functional/electrical performance of the circuit design. If the functional performance of the design is incomplete or incorrect, the circuit designer can make changes to the circuit design using design and constraint entry tools 564. Custom layout tools 576 can be used to place and connect each transistor to the netlist produced by tools 564. After an implementation of the desired circuit design has been generated using tools 576, the implementation of the design may be analyzed and tested using analysis tools 578.

The circuit description prior to the layout implementation using tools 576 is generally referred to as the "pre-layout" circuit, whereas the circuit description after the place and route steps is referred to as the "post-layout" circuit. For digital circuits where the data values are simply logic ones and zeroes, the performance discrepancy between the pre-layout and the post-layout circuits should be carefully monitored to ensure that minimum timing requirements are met. For analog circuits, parasitic RC components can cause the RF performance of the post-layout circuit to be drastically different than that of the pre-layout circuit. In contrast to digital circuits, the placement and routing for analog circuits may also be performed manually by a specialized analog circuit layout designer to ensure that potentially undesired systematic effects due to poor layout configurations are minimized.

Figure 7:
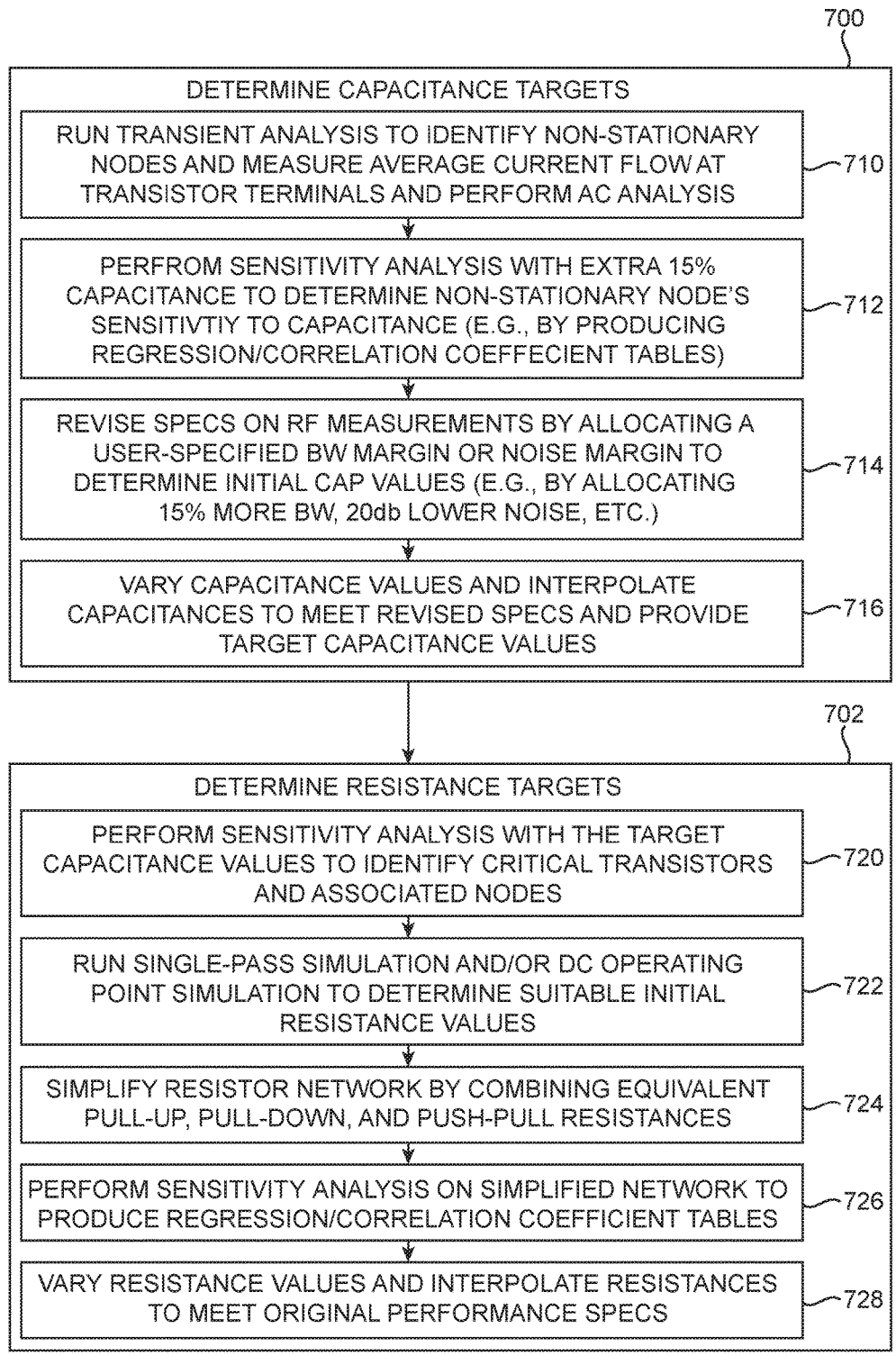
FIG. 7 is a flow chart of illustrative steps for defining target capacitance values and target resistance values from radio-frequency (RF) simulations in accordance with an embodiment.

In order to accurately account for the post-layout wiring parasitics, it may be important to determine target RC design values based on RF measurement data. The overall flow for defining the target RC values is shown in FIG. 7. As shown in FIG. 7, the first half of the overall flow involves determining the capacitance values at steps 700, and the second half of the overall flow involves determining the resistance values at steps 702 with the newly defined capacitance targets. This flow assumes that the RF circuit designer has already prepare a simulation testbench with measurement macros for the RF measurement parameter of interest. For each RF measurement parameter, the RF circuit designer would have already assigned a performance criteria or target. The RF circuit designer should have also already designed the circuit with some margin in mind to account for potential performance degradation due to parasitic RC components.

In determining the capacitance targets, the original RF performance targets set by the circuit designer need to be revised to apportion some budget for the parasitic capacitance as well as the remaining budget for the parasitic resistance. To reduce the amount of analysis and to save time, circuit design tools of the type described in connection with FIGS. 4-6 may be used to identify nodes in the analog circuitry that is most sensitive to capacitance. At step 710, the circuit design/simulation tools may perform transient analysis to identify which nodes are stationary and which nodes are non-stationary and also to collect data on the average current flow of transistor terminals and pins. The average current flow data can be used later to help simplify the resistance determination steps 702. The stationary nodes can afford high capacitance, whereas the non-stationary nodes (i.e., nodes that see a lot of switching activity) are most sensitive to additional capacitance. At step 710, small signal (alternating current) RF analysis may also be performed to obtain the capacitance at each of the non-stationary nodes and to obtain RF measurement data (e.g., using an RF analysis test bench to measure radio-frequency noise, harmonics, transfer function, and other types of frequency response).

At step 712, the tools may be used to perform sensitivity analysis with an extra (e.g., a user-defined extra 15%) capacitance on only the non-stationary nodes to determine the non-stationary nodes' actual sensitivity to capacitance. This is merely illustrative. If desired, other amounts of additional capacitance such as 10% or more, 20% or more, or 30% or more may be used. In general, this factor may be constrained by the allocated power budget, so a 20% buffer would also imply an additional power consumption of 20%, which may or may not be acceptable. In particular, the circuit simulation tools may be used to produce a regression coefficient table and a correlation coefficient table.

FIG. 8A is a table of regression coefficient values showing how much RF measurement parameters vary with respect to changes in the capacitance at each non-stationary node. As shown in table 800 of FIG. 8A, a respective regression coefficient value may be generated at each non-stationary node (e.g., cap node 1, cap node 2, cap node 3, etc.) for various RF performance specifications/parameters (e.g., spec 1, spec 2, and spec 3). For example, the different performance specifications may include gain, bandwidth, phase margin, power supply rejection ratio, just to name a few. Regression coefficient table 800 indicate how much RF measurement parameters changes with respect to changes in each node capacitance.

FIG. 8B is a table of correlation values. As shown in table 800 of FIG. 8B, a respective correlation coefficient value may be generated at each non-stationary node (e.g., cap node 1, cap node 2, cap node 3, etc.) for various RF measurement parameters (e.g., spec 1, spec 2, and spec 3). In contrast to the regression coefficients, correlation coefficients higher than about 0.8 indicate which nodes are influential for each RF measurement parameter.

At step 714, the RF measurement specifications may be revised by allocating a user-specified RF measurement parameter such as bandwidth (BW) or noise margin to determine initial capacitance values. For example, an additional 15% bandwidth margin (compared to the actual bandwidth specification) may be allocated or an additional 20 dB lower noise margin (compared to actual noise limit specification) may be specified. The margin can then be used to determine the allowable parasitic resistance target later. Without any margin or budget left, it would be impossible to find any feasible parasitic resistance values as all the electrical performance margin or budget has been allocated for the parasitic capacitances.

At step 716, the design tools may be used to compute multiple capacitances values based on the initial capacitance value determined at step 714 and an interpolation step size for each RF measurement parameter to meet the revised specifications (i.e., the revised specifications determined at step 714). The interpolation step size for each RF measurement parameter may be determined using the regression coefficients. If the measurement result is already very close to the revised specification, then the interpolation step size ought to be smaller. Likewise, if the regression coefficient is high, which indicates that a small change in the node capacitance would result in a big change in the measurement result, then the interpolation step size ought also be made small. Target capacitance values can then be computed from the various interpolation points via interpolation techniques. Further details of step 716 are illustrated in FIGS. 9 and 10.

Figure 9:
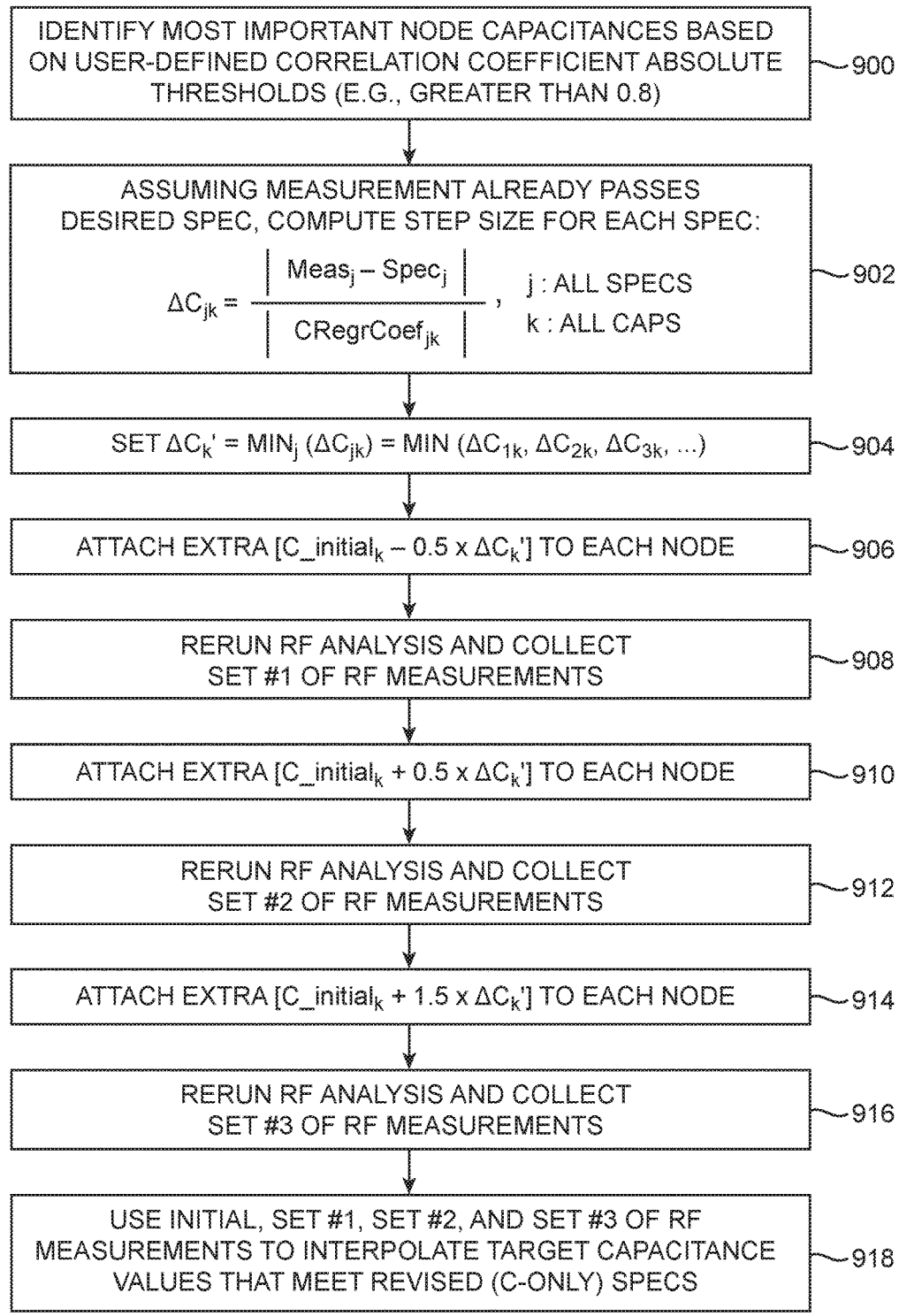
FIG. 9 is a flow chart of illustrative steps for identifying multiple interpolation points based on the regression coefficients and then performing interpolation to define desired target capacitance values in accordance with an embodiment.
Figure 10:
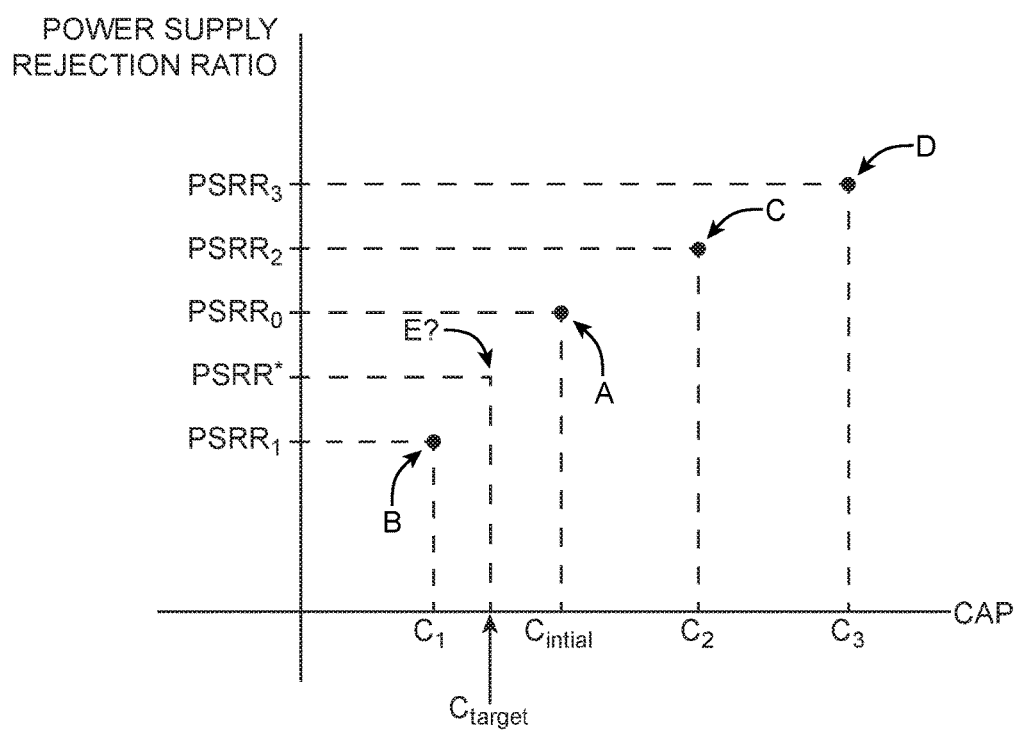
FIG. 10 is a diagram illustrating how a target capacitance value may be computed via interpolation in accordance with an embodiment.

FIG. 9 is a flow chart of illustrative steps for identifying multiple interpolation points based on the regression coefficients and then performing interpolation to define the desired target capacitance values. At step 900, the most important node capacitances may be identified based on user-specified correlation coefficient absolute threshold levels. For example, only nodes exhibiting correlation coefficient values that are greater than a threshold of 0.8 may be deemed critical. A user-defined correlation coefficient threshold of 0.8 is merely illustrative. If desired, the predetermined correlation coefficient threshold value relied on in step 900 can be at least 0.9, more than 0.8, less than 0.8, 0.7 or less, or other suitable threshold levels.

Assuming that the RF measurements obtained from the RF analysis already pass the desired specifications, an interpolation step size $\Delta C_{jk}$ may be computed for each specification using the following equation at step 902:

$$\Delta C_{jk} = \frac{|Meas_j - Spec_j|}{|CregrCoef_{jk}|} \quad (1)$$

Where index j is varied across all specifications (or "specs"), where index k is varied across all node capacitances, where $Meas_j$ represents the measurements extracted using the RF analysis, where $Spec_j$ represents the target specification, and wherein coefficient $CRegrCoef_{jk}$ is obtained from table 800 of FIG. 8A.

At step 904, a token interpolation step size $\Delta C_k'$ may be selected by finding the minimum step size for each node capacitance across all specs. At step 906, an extra [C_initial$_k$ minus $0.5*\Delta C_k'$] may be attached to each node k, where C_initial$_k$ represents one of the initial capacitance values obtained during step 714 of FIG. 7. At step 908, the RF analysis may be rerun to obtain a first set of RF measurement data. At step 910, an extra [C_initial$_k$ plus $0.5*\Delta C_k'$] may be attached to each node k. At step 912, the RF simulation may be rerun to obtain a second set of RF measurement data. At step 912, an extra [C_initial$_k$ plus $1.5*\Delta C_k'$] may be attached to each node k. At step 914, the small signal AC analysis may again be rerun to obtain a third set of RF measurement data.

At step 918, the first, second, and third sets of RF measurement data obtained from steps 908, 912, and 914 may be used to interpolate target capacitance values that meet the revised RF spec. FIG. 10 is a diagram illustrating how a target capacitance value for a given capacitive node may be computed via interpolation in accordance with an embodiment. The example of FIG. 10 plots the power supply rejection ratio (PSRR) spec versus capacitance. As shown in FIG. 10, C_initial may have a corresponding rejection ratio of $PSRR_0$ (see point A). Capacitance C1 (which is a half interpolation step less than C_initial) may have a corresponding rejection ratio of $PSRR_1$ acting as the first set of RF measurement data (see point B). Capacitance C2 (which is a half interpolation step greater than C_initial) may have a corresponding rejection ratio of $PSRR_2$ acting as the second set of RF measurement data (see point C). Capacitance C3 (which is a one and a half interpolation step greater than C_initial) may have a corresponding rejection ratio of $PSRR_3$ acting as the third set of RF measurement data (see point D). By interpolating among at least points B-D and perhaps even A, a target capacitance value Ctarget may be computed which satisfies the revised target spec PSRR* (see point E).

The exemplary steps describe above in which the target capacitance values are computed via interpolation techniques to meet the revised spec for RF measurements is merely illustrative. If desired, extrapolation techniques may also be used without departing from the spirit of the present embodiments.

Once the capacitance targets have been determined, the circuit design tools may be used to extract the resistance targets. As with the capacitance, it is not necessary to investigate every wiring resistance. To reduce the selection of resistances for analysis, steps 702 (referring back to FIG. 7) involve gleaning information from the transistors on the integrated circuit. At step 720, sensitivity analysis may be performed with the target capacitance values derived from steps 700 to help identify which transistors are critical to the performance of the circuit. For instance, a transistor having drain/gate/source resistances that can greatly affect the RF performance of an analog circuit on device 10 is deemed to be critical. If a certain transistor is critical, then by natural extension, the wires connected to the drain, source, and gain terminal of that transistor should also be considered to be critical.

At step 722, the design tools may conduct single-pass simulation to collect the delta drain-to-source voltage $\Delta Vds$, the delta drain-to-source current $\Delta Ids$, and transconductance Gm for each critical transistor. A transistor's drain resistance can be computed by dividing $\Delta Vds$ by $\Delta Ids$ (i.e., $\Delta Vds/\Delta Ids$), while a transistor's source resistance is simply the reciprocal of its transconductance (i.e., 1/Gm). Transconductance Gm can be computed by dividing two times the transistor source-drain current Ids by the difference of the transistor gate-to-source voltage Vgs and transistor threshold voltage Vt (i.e., $Gm=2*Ids/(Vgs-Vt)$). The resistance of the gate can be determined simply from the geometry of the transistor (i.e., from its gate width and length). All of these values may be used to determine initial resistance values.

The single-pass simulation may also be complemented by a direct current (DC) operating point simulation to determine the DC current flows and a transient simulation (which was performed earlier at step 710) to identify the stationary nodes. Some stationary nodes are of particular interest because those nodes are typically attached to a current source; thus, another criteria such as an IR (current-resistance) drop budget can be used to obtain the initial resistance values. For such nodes, a high IR drop can be detrimental to the RF performance of that circuit so it may be desirable to limit the amount of parasitic resistance on that node. Knowledge of the DC current flow helps to identify the location of the transistor drain and source terminals since current flows from the drain terminal to the source terminal for an re-channel transistor or vice versa for a p-channel transistor.

Figure 11:
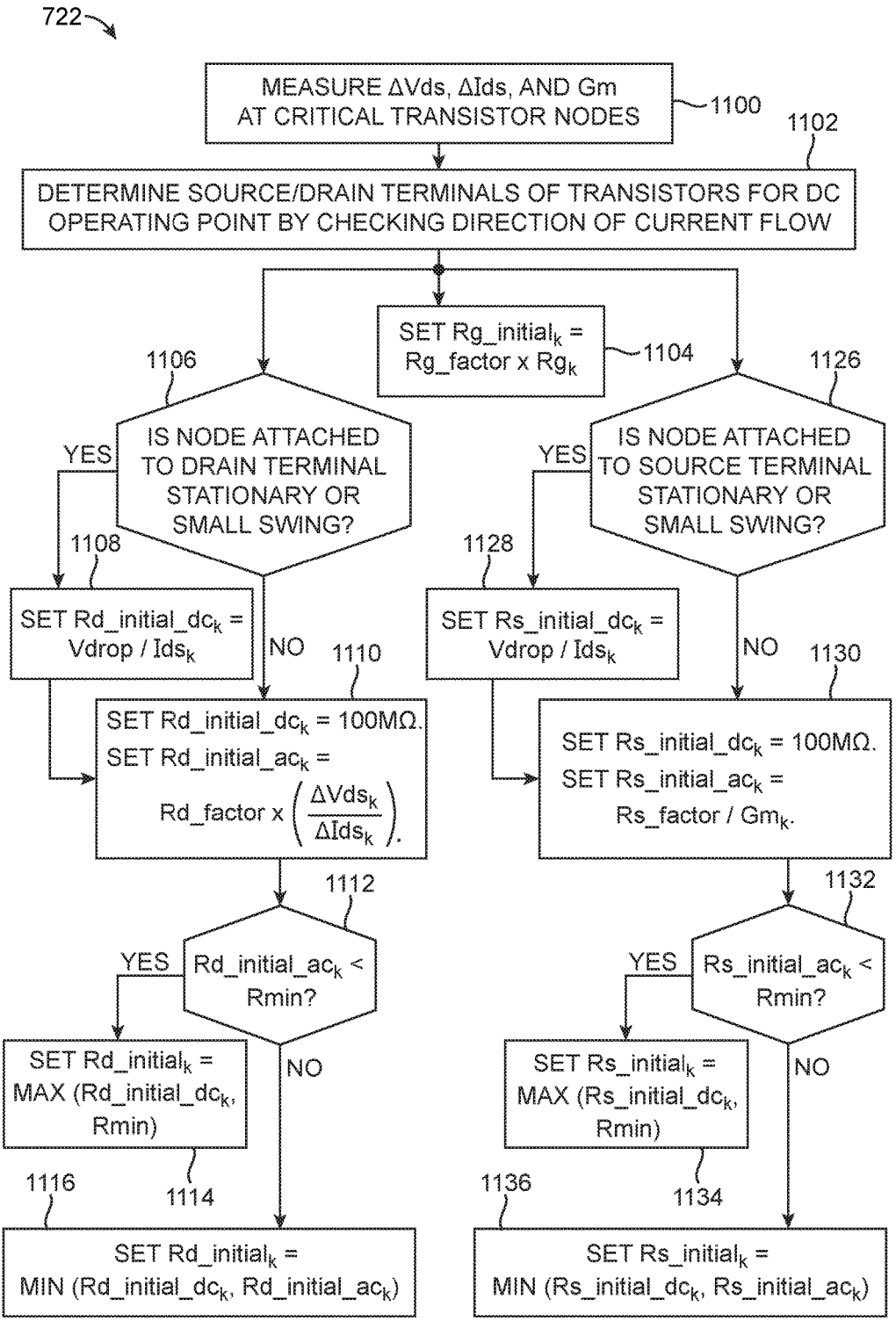
FIG. 11 is a flow chart of illustrative steps for determining initial resistance values at critical transistor terminals in accordance with an embodiment.

FIG. 11 is a flow chart of illustrative sub-steps that may be performed during step 722 of FIG. 7 to determine initial resistance values at critical transistors. At step 1100, delta drain-to-source voltage $\Delta Vds$, delta drain-to-source current $\Delta Ids$, and transconductance Gm may be measured at the critical transistor nodes. At step 1102, the source/drain terminals for each critical transistor may be identified by running DC operating point simulation to check the direction of current flow. For an n-channel transistor, current typically flows into the drain terminal and out from the source terminal. For a p-channel transistor, current typically flows into the source terminal out from the drain terminal.

At step 1104, the initial gate resistance of a transistor k ($Rg\_initial_k$) may be set equal to the product of a user-defined user-defined gate resistance factor Rfactor and the transistor's nominal gate resistance $Rg_k$. As an example, the user-defined gate resistance factor Rfactor may be a globally defined factor that is equal to 10%. Gate resistnace $Rg_k$ may be derived from the geometry of the transistor's polysilicon gate conductor.

At step 1106, the simulation tools may check whether the node attached to the drain terminal is stationary (i.e., whether the signal swing that the drain terminal is small). If the drain terminal is stationary, then the initial DC drain resistance $Rd\_initial\_dc_k$ may be set equal to a user-specified voltage drop Vdrop divided by the source-drain current $Ids_k$. Voltage drop Vdrop sets a maximum voltage amount that can be tolerated due to an IR drop by DC current flowing through a wire. Voltage Vdrop may be set equal to 25 mV (as an example) or may be set equal to any other suitable threshold. Any IR drop that exceeds this threshold may change the circuit performance significantly and is therefore undesirable.

If the drain terminal is non-stationary (i.e., if the voltage switching activity at the drain terminal is high), the initial DC drain resistance Rd_initial_dc$_k$ may be set equal to 100 mega-ohms or other high value (see step 1110). At step 1110, the initial AC drain resistance Rd_initial_ac$_k$ may be set equal to a user-defined drain resistance factor Rd_factor times the nominal drain resistance of that transistor, which is equal to $\Delta Vds_k/\Delta Ids_k$.

At step 1112, the design tools may check whether initial AC drain resistance Rd_initial_ac$_k$ is less than a minimum user-defined resistance threshold Rmin to ensure that the resistance isn't too small. If the initial AC drain resistance is less than minimum threshold Rmin, the initial drain resistance Rd_initial$_k$ may be set equal to the maximum of Rd_initial_dc$_k$ and Rmin (at step 1114). If the initial AC drain resistance is greater than Rmin, initial drain resistance Rd_initial$_k$ may be set equal to the minimum of Rd_initial_dc$_k$ and and Rd_initial_ac$_k$ (at step 1116).

The source resistance of transistor k may also be determined using a similar approach. At step 1126, the simulation tools may check whether the node attached to the source terminal is stationary. If the source terminal is stationary, then the initial DC source resistance Rs_initial_dc$_k$ may also be set equal to amount Vdrop divided by source-drain current Ids$_k$. If the source terminal is non-stationary, the initial DC source resistance Rs_initial_dc$_k$ may be set equal to 100 mega-ohms or other high value (see step 1130). At step 1130, the initial AC source resistance Rs_initial_ac$_k$ may be set equal to a user-defined source resistance factor Rs factor times the nominal source resistance of that transistor, which is equal to 1/Gm.

At step 1132, the design tools may check whether initial AC source resistance Rs_initial_ac$_k$ is less than minimum user-defined resistance threshold Rmin to ensure that the resistance isn't too small. If the initial AC source resistance is less than minimum resistance level Rmin, the initial source resistance Rs_initial$_k$ may be set equal to the maximum of Rs_initial_dc$_k$ and Rmin (at step 1134). If the initial AC source resistance is greater than Rmin, initial source resistance Rs_initial$_k$ may be set equal to the minimum of Rs_initial_dc$_k$ and and Rs_initial_ac$_k$ (at step 1136).

Figure 12A:
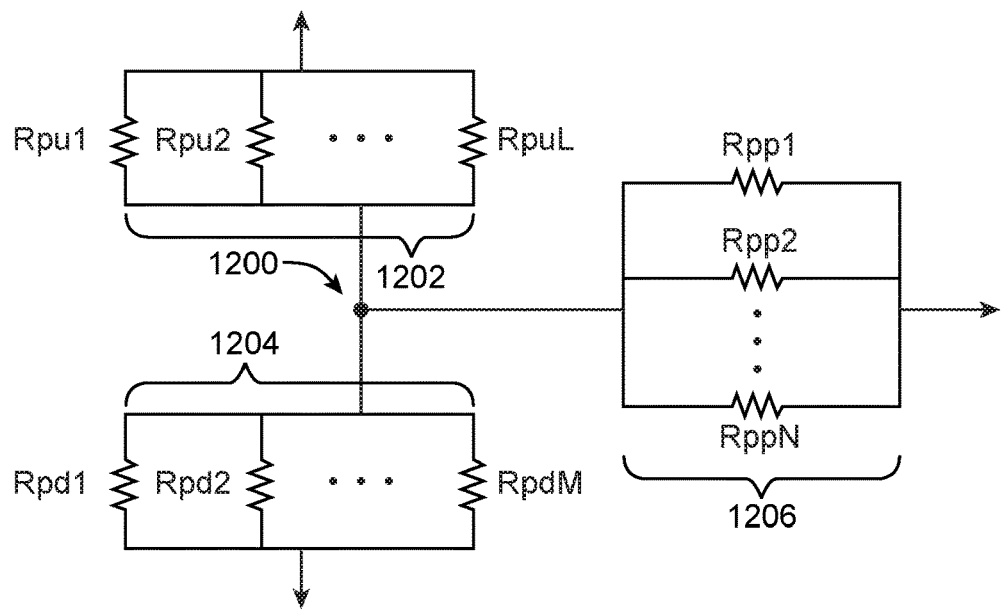
FIGS. 12A and 12B illustrate how all functionally equivalent pull-up resistors may be combined, pull-down resistors may be combined, and push-pull resistors may be combined at critical nodes in accordance with an embodiment.

Referring back to step 724 of FIG. 7, it may generally be desirable to reduce the total number of variables for simulation by simplifying resistor networks (e.g., by combining equivalent pull-up resistances, pull-down resistances, and push-pull resistances). FIG. 12A shows a group of L pull-up resistors 1202, a group of M pull-down resistors 1204, and a group of N push-pull resistors 1206 that are coupled to node 200. Components attached to node 200 may be indexed by variable i. The pull-up resistances (Rpu) are associated with all components where net current is flowing out of the components. The pull-down resistances (Rpd) are associated with all components where net current is flowing into the components. The push-pull resistances (Rpp) are associated with all components where a net zero current flows in/out of the components. Any of resistances Rpu, Rpd, and Rpp may include various transistor drain resistance, transistor source resistance, and/or transistor gate resistance (not possible for metal-oxide-semiconductor transistors but possible of bipolar junction transistors).

Figure 12B:
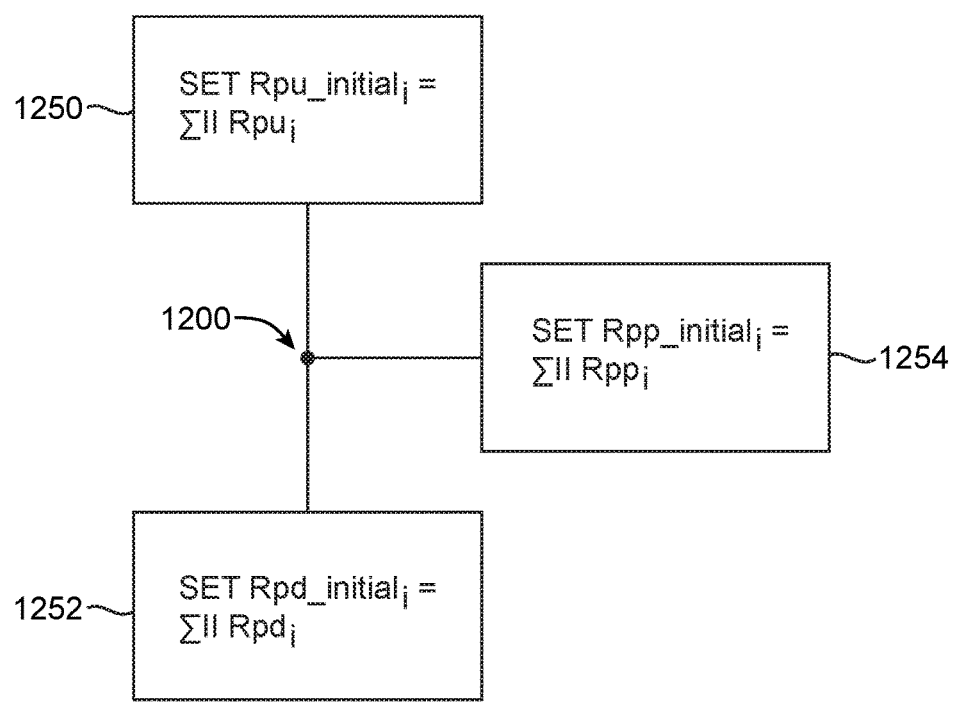

FIG. 12B shows how the multiple parallel resistors in each group may be combined. As shown in FIG. 12B, the L parallel pull-up resistors Rpu in group 1202 may be combined together to form a simplified pull-up network 1250 having an initial pull-up resistance Rpu_initial$_i$ (e.g., using the parallel resistance formula commonly known in the art). Index i may be varied across all critical nodes in the circuit design. Similarly, the M parallel pull-down resistors Rpd in group 1204 may be combined together to form a simplified pull-down network 1252 having an initial pull-down resistance Rpd_initial$_i$. The N parallel push-pull resistors Rpp in group 1206 may be combined together to form a simplified pull-down network having an initial push-pull resistance Rpp_initial$_i$.

At step 726, sensitivity analysis may be performed on the simplified resistor networks to produce regression and coefficient tables for the resistance values. FIG. 13A is a table of regression coefficient values for pull-up resistances. A respective regression coefficient value may be generated for each group of pullup resistor networks (e.g., networks RPU1, RPU2, RPU3, etc.) for various RF performance specifications/parameters. FIG. 13B is a table of correlation coefficient values for the pull-up resistance. Similarly, a respective correlation coefficient value may be generated for each group of pullup resistor networks for the various RF performance specifications. FIGS. 13A and 13B show only the regression and correlation coefficient tables and is merely illustrative. In general, regression and correlation coefficient tables of such type may also be generated for the pull-down resistance networks and the push-pull resistance networks.

Referring back to step 728 of FIG. 7, the regression coefficients would then be used to determine interpolation step sizes, collect measurements from various interpolation points, and then compute the desired resistance targets that meet the original performance specifications. The interpolation operation may involve first computing the appropriate interpolation step size (see, e.g., steps 728-1 of FIG. 14) and then performing interpolation from multiple interpolation points (see, e.g., steps 728-2 of FIG. 15).

FIG. 14 is a flow chart of illustrative steps for deriving interpolation step sizes for the pull-up resistance in accordance with an embodiment. Assuming that the RF measurements obtained from the RF analysis already pass the desired specifications, an interpolation step size $\Delta Rpu_{jk}$ may be computed for each specification using the following equation at step 1400:

$$\Delta Rpu_{jk} = \frac{|Meas_j - Spec_j|}{|RpuRegrCoef_{jk}|} \quad (1)$$

Where index j is varied across all specifications (or "specs"), where index k is varied across all transistors, where Meas$_j$ represents the measurements extracted using the RF analysis, where Spec$_j$ represents the target specification, and wherein coefficient RpuRegrCoef$_{jk}$ is obtained from table 1300 of FIG. 13A.

At step 1402, a token interpolation step size $\Delta Rpu_k'$ may be selected by finding the minimum step size for each pullup resistance across all specs. FIG. 14 only shows steps for finding the token interpolation step size for the pullup resistance but this is merely illustrative. Such approach may similarly be used to obtain the interpolation step size for the pulldown resistance Rpd and the pushpull resistance Rpp for each transistor k.

Figure 15:
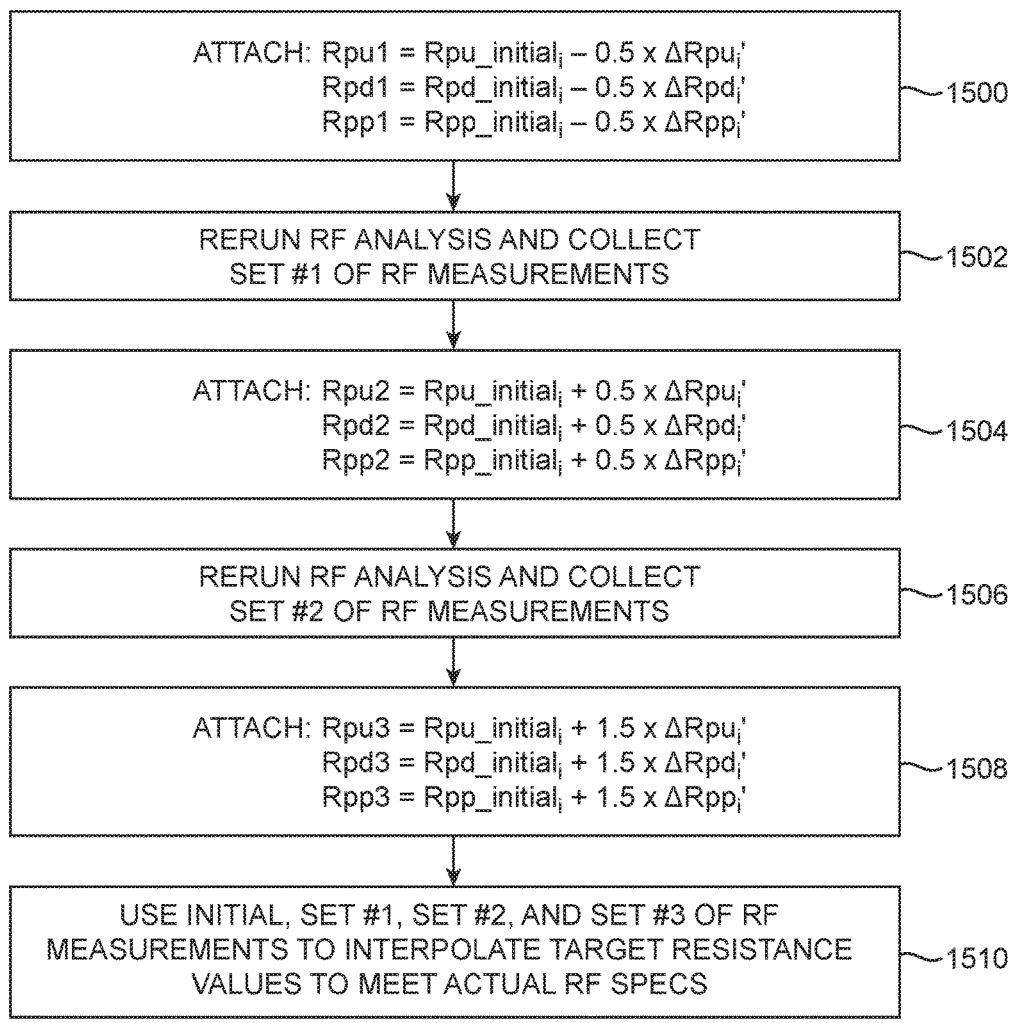
FIG. 15 is a flow chart of illustrative steps for performing interpolation to define desired target resistance values in accordance with an embodiment.

FIG. 15 is a flow chart of illustrative steps for performing interpolation to define the desired target resistance values. At step 1500, an extra Rpu1 that is equal to [Rpu_initial$_i$ minus 0.5*$\Delta Rpu_i'$] may be attached to each node i, where Rpu_initial$_i$ represents some combination of the initial source/drain/gate resistance values obtained from the steps of FIG. 11 and the initial simplified pull-up resistance values obtained from the steps described in connection with FIG. 12B. Additional pull-down resistance Rpd1 and push-pull resistance Rpp1 may be similarly attached to node i in this way. At step 1502, the RF analysis may be rerun to obtain a first set of RF measurement data.

At step 1504, an extra Rpu2 that is equal to [Rpu_initial$_i$ plus 0.5*ΔRpu$_i$'] may be attached to each node i. Additional pull-down resistance Rpd2 and push-pull resistance Rpp2 may be similarly attached to node i in this way. At step 1506, the RF analysis may be rerun to obtain a second set of RF measurement data.

At step 1508, an extra Rpu3 that is equal to [Rpu_initial$_i$ plus 1.5*ΔRpu$_i$'] may be attached to each node i. Additional pull-down resistance Rpd3 and push-pull resistance Rpp3 may be similarly attached to node i in this way. At step 1510, the RF analysis may be rerun to obtain a third set of RF measurement data.

At step 1510, the first, second, and third sets of RF measurement data obtained from steps 1502, 1506, and 1510 may be used to interpolate target resistance values that meet the original RF spec. The approach for interpolation the target resistance values may be similar to that illustrated in FIG. 10.

The exemplary steps describe above in which the target resistance values are computed via interpolation techniques to meet the original spec for RF measurements is merely illustrative. If desired, extrapolation techniques may also be used without departing from the spirit of the present embodiments. If desired, target resistance values may be obtained before determining target capacitance values (e.g., the order of steps 700 and 702 may be swapped).

Operated in this way, this design methodology is able to utilize the sensitivity analysis in an efficient manner to help extra RC targets for an analog/RF integrated circuits. This is made possible with the aid of DC operating point and transient simulations, coupled with the use of interpolation techniques. In general, sensitivity analysis requires a substantially greater number of simulation iterations for each variable, whereas the interpolation varies all the resistances and the capacitances together simultaneously. By not blindly applying sensitivity simulation to all capacitances and resistances in the circuit, the design time can be greatly reduced.

Additional, this methodology provides a consistent, efficient, and accurate approach for translating a circuit-centric RF design specification into layout-centric RC design targets. This combined approach of using both sensitivity analysis coupled with ways of reducing the number of variables under analysis and interpolation techniques helps to avoid costly layout iterations that would otherwise delay project development and consume circuit and layout designer man-hours.

The embodiments thus far have been described with respect to integrated circuits. The methods and apparatuses described herein may be incorporated into any suitable circuit. For example, they may be incorporated into numerous types of devices such as programmable logic devices, application specific standard products (ASSPs), and application specific integrated circuits (ASICs). Examples of programmable logic devices include programmable arrays logic (PALs), programmable logic arrays (PLAs), field programmable logic arrays (FPGAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

The programmable logic device described in one or more embodiments herein may be part of a data processing system that includes one or more of the following components: a processor; memory; IO circuitry; and peripheral devices. The data processing can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the family of devices owned by ALTERA/INTEL Corporation.

The foregoing is merely illustrative of the principles of this invention and various modifications can be made by those skilled in the art. The foregoing embodiments may be implemented individually or in any combination.

What is claimed is:

1. A method for using circuit design tools to implement an integrated circuit, comprising:
   determining target capacitance values by selectively performing sensitivity analysis on only a subset of capacitances on the integrated circuit;
   determining target resistance values by selectively performing sensitivity analysis on only a subset of resistances on the integrated circuit, wherein determining the target resistive values comprises performing sensitivity analysis to identify critical transistors on the integrated circuit; and
   generating a design for the integrated circuit based on the target capacitance values and the target resistance values and configuring the integrated circuit with the design.

2. The method of claim 1, wherein determining the target capacitance and resistance values comprises performing radio-frequency (RF) simulation.

3. The method of claim 1, wherein determining the target capacitance values comprises performing transient analysis to identify non-stationary nodes.

4. The method of claim 3, wherein determining the target capacitance values further comprises performing sensitivity analysis to generate regression and correlation coefficients.

5. The method of claim 4, wherein determining the target capacitance values further comprises revising original performance specifications by allocating additional margin.

6. The method of claim 5, wherein determining the target capacitance values further comprises performing interpolation to compute the target capacitance values that satisfy the revised performance specifications.

7. The method of claim 1, wherein determining the target resistive values further comprises performing single-pass simulation and DC operating point simulation to obtain initial drain, gate, and source resistance values for the critical transistors.

8. The method of claim 7, wherein determining the target resistive values further comprises simplifying resistive networks by combining equivalent pull-up, pull-down, and push-pull resistances.

9. The method of claim 8, wherein determining the target resistive values further comprising performing additional sensitivity analysis on the simplified resistive networks to generate regression and correlation coefficients.

10. The method of claim 9, wherein determining the target resistance values further comprises performing interpolation to compute the target resistance values that satisfy original performance specifications.

11. A method of using simulation tools running on circuit design computing equipment to implement an integrated circuit, comprising:
   obtaining initial parasitic component values;
   gathering radio-frequency measurement data on the integrated circuit;
   computing an interpolation step size based on the radio-frequency measurement data;
   performing sensitivity analysis to generate regression coefficients, wherein the regression coefficients are used to compute the interpolation step size;
   performing interpolation using the initial parasitic component values and the computed interpolation step size to obtain desired target parasitic component values; and
   generating a design for the integrated circuit based on the target parasitic component values and configuring the integrated circuit with the design.

12. The method of claim 11, wherein obtaining the initial parasitic component values comprises obtaining a selected one of initial capacitance values and initial resistance values.

13. The method of claim 11, further comprising:
   performing sensitivity analysis to generate correlation coefficients; and
   identifying critical capacitive nodes that affect radio-frequency performance of the integrated circuit by comparing the correlation coefficients to a predetermined threshold.

14. The method of claim 11, further comprising:
   identifying critical transistors that affect radio-frequency performance of the integrated circuit.

15. A method of using computer-aided design tools implemented on computer equipment to design an integrated circuit, the method comprising:
   identifying non-stationary nodes in the integrated circuit;
   performing sensitivity analysis to determine the non-stationary nodes' sensitivity to additional capacitance;
   performing interpolation using results from the sensitivity analysis to obtain target capacitance values for the integrated circuit; and
   generating a design for the integrated circuit based on the target capacitance values and configuring the integrated circuit with the design.

16. The method of claim 15, wherein performing the sensitivity analysis comprises generating regression and correlation coefficient values for the additional capacitance.

17. The method of claim 16, further comprising:
   performing additional sensitivity analysis to obtain regression coefficient values; and
   performing interpolation using the initial resistance values and the regression coefficients to obtain target resistance values for the integrated circuit.

18. The method of claim 15, further comprising:
   in response to obtaining the target capacitance values, identifying critical transistors in the integrated circuit; and
   computing initial resistance values associated with the critical transistors.

19. The method of claim 15, wherein performing interpolation using the results from the sensitivity analysis comprises:
   obtaining a first set of radio-frequency measurement data;
   obtaining a second set of radio-frequency measurement data; and
   interpolating between the first and second sets of radio-frequency data to obtain at least one of the target capacitance values.

* * * * *